United States Patent
Werson et al.

(10) Patent No.: US 8,353,687 B2
(45) Date of Patent: Jan. 15, 2013

(54) ROTARY PUMP WITH A FIXED SHAFT

(75) Inventors: Michael John Werson, Eastleigh (GB); Colin Richard French, Winchester (GB)

(73) Assignee: Dohler Motor GmbH, Nürnberg (DE)

( * ) Notice: Subject to any disclaimer, the term of this patent is extended or adjusted under 35 U.S.C. 154(b) by 296 days.

(21) Appl. No.: 12/654,237

(22) Filed: Dec. 15, 2009

(65) Prior Publication Data
US 2010/0158714 A1    Jun. 24, 2010

(30) Foreign Application Priority Data

Dec. 19, 2008 (DE) .................. 10 2008 064 162

(51) Int. Cl.
*F04D 29/58* (2006.01)
*F04D 13/06* (2006.01)

(52) U.S. Cl. ............ 417/423.1; 417/369; 417/379; 417/420; 417/423.7; 310/156.32; 310/268

(58) Field of Classification Search ............... 417/369, 417/379, 420, 423.1, 423.7; 310/156.32–156.37, 310/268
See application file for complete search history.

(56) References Cited

U.S. PATENT DOCUMENTS

| | | | | |
|---|---|---|---|---|
| 4,047,847 A | * | 9/1977 | Oikawa | ............ 417/370 |
| 4,714,998 A | * | 12/1987 | Bussey et al. | ............ 701/99 |
| 4,806,080 A | | 2/1989 | Mizobuchi et al. | |
| 6,032,960 A | * | 3/2000 | Wendl et al. | ............ 277/627 |
| 6,034,465 A | * | 3/2000 | McKee et al. | ............ 310/268 |
| 6,422,838 B1 | | 7/2002 | Sloteman | |
| 2002/0166520 A1 | | 11/2002 | Heim et al. | |
| 2004/0184936 A1 | * | 9/2004 | Yanagihara et al. | ......... 417/420 |
| 2004/0234395 A1 | * | 11/2004 | Hatano | ............ 417/420 |
| 2007/0286723 A1 | * | 12/2007 | Ihle et al. | ............ 415/206 |

FOREIGN PATENT DOCUMENTS

DE   19646617 A1   5/1998
EP   1256722 A2   11/2002

* cited by examiner

Primary Examiner — Devon Kramer
Assistant Examiner — Dominick L Plakkoottam
(74) Attorney, Agent, or Firm — Jacobson Holman PLLC (57) ABSTRACT

A rotary pump (1), which can be operated by an electronically commutated DC motor (56) with an axial gap, with a dry space (54), in which a wound stator (55) is accommodated, and a fluid-fillable pump space (13), in which a permanent magnetic pump impeller (5) is accommodated to rotate, the pump impeller (5) being separated by a split plate (18) from stator (55), which is connected to a return ring (27), to which several poles (15) are connected, and a circuit board (17), and is in heat-conducting contact with it, and includes a heat conducting element (10) from a good heat conducting light metal. The heat conducting element (10) consists essentially of a disk (40) aligned at right angles to the motor shaft or an annular disk with a coaxial tube (39) extending in the direction of the pump impeller in one piece with it, open or closed toward the motor shaft, and that the circuit board (17) is connected to the heat-conducting element (15) on the side facing away from the pump impeller (5).

21 Claims, 6 Drawing Sheets

ROTARY PUMP WITH A FIXED SHAFT

BACKGROUND OF THE INVENTION (1) Field of the Invention

The invention concerns a rotary pump, which can be operated by an electronically commutated DC motor with an axial gap, with a dry space, in which a wound stator is accommodated, and a fluid-fillable pump space, in which a permanent magnetic pump impeller is accommodated to rotate, the pump impeller being separated from the stator by a split plate, which is connected to a return ring, to which several poles are connected, and a circuit board, and is in heat conducting contact and includes a heat conducting element from a good heat conducting light metal.

(2) Description of Related Art Including Information Disclosed Under 37 CFR 1.97 and 1.98

A generic rotary pump is known from DE 196 46 617 A1, in which a shaft is accommodated on two pump housing parts. The housing consists of a good heat conducting material, for example, light metal or steel, and carries the stator. Since heat removal can only occur via the surrounding air, only a restricted cooling effect is attainable.

An object of the invention is to ensure excellent efficiency in a compact design and simple assembly in a rotary pump of the generic type just mentioned. In addition, the rotary pump is also supposed to guarantee high lifetime and improve heat removal.

BRIEF SUMMARY OF THE INVENTION

The object is met according to the invention by the provision of a rotary pump, which can be driven by an electronically commutated DC motor with an axial gap, a wound stator, and a motor shaft. The rotary pump is made up of a drive space, in which the wound stator is accommodated; a permanent magnetic pump impeller; a fluid-fillable pump space, in which the pump impeller is accommodated to rotate; a split plate for separating the pump impeller from the wound stator; a return ring connected to and in heat conducting contact with the split plate; a plurality of poles connected to the split plate; a heat-conducting element made from a heat conducting metal, wherein the heat-conducting element includes a disk aligned at right angles to the motor shaft or an annular disk with a tube connected to it in one piece open or closed to the motor shaft and extending coaxially in the direction toward the pump impeller, and a circuit board connected to the heat-conducting element on the side facing away from pump impeller.

A large heat exchange surface is provided by the one-piece heat-conducting element, made of a disk with a tube connected to it. The tube can accommodate components that are used for cooling purposes or other components, in order to save space, in which these components can then remove heat to the heat-conducting element.

Modifications of the invention are also presented. Through direct contact with a flow of the feed medium caused by the pump impeller, excellent cooling effect is provided. Because of this, the lifetime of the rotary pump is also increased. Separation of the dry space from the pump space by the heat-conducting element permits particularly simple sealing, which can be mounted reliably. The special design of the heat-conducting element permits very compact structure of the rotary pump.

BRIEF DESCRIPTION OF THE SEVERAL VIEWS OF THE DRAWINGS

A practical example of the invention is explained below with reference to the drawing. In the drawing.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
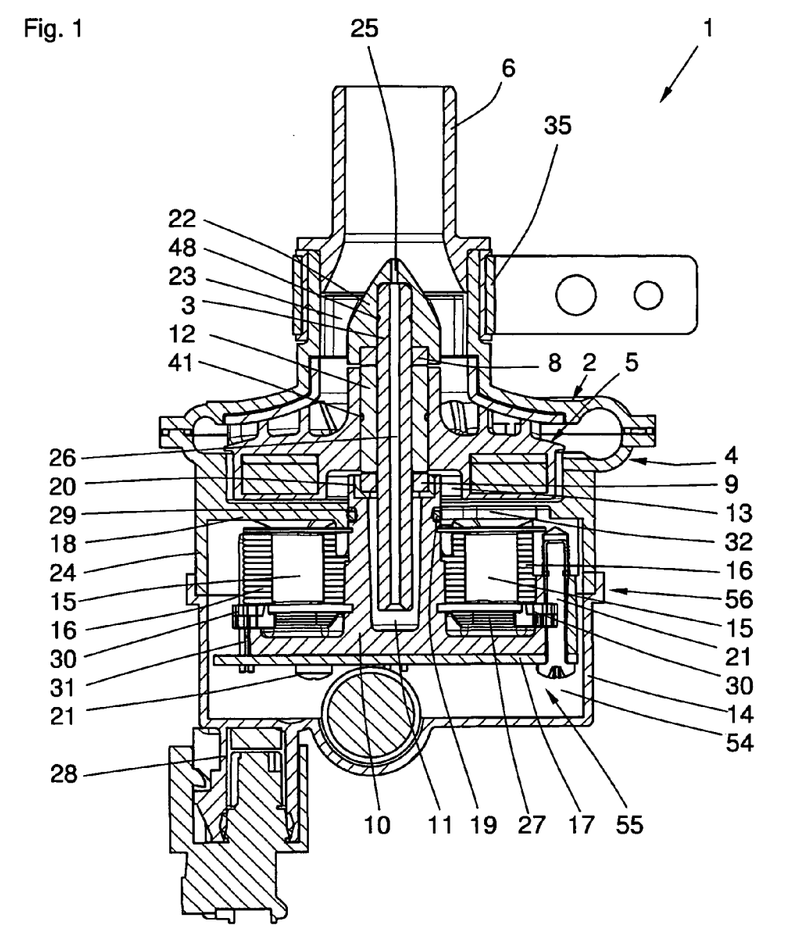
FIG. 1 shows a sectional view through a rotary pump.

FIG. 1 shows a sectional view through a rotary pump 1 operated by an axial motor 56 with a pump housing 4, consisting of a first pump housing part 2 (pump head), a second pump housing part 24, with a split plate 18 and a motor housing 14 defining a dry chamber 54, a pump impeller 5, which is mounted to rotate on a shaft 3 via a fixed bearing 12, said fixed bearing 12 being supportable axially on one side on a first axial bearing ring 8 and on the other side on a second axial bearing ring 9, a heat-conducting element 10, consisting of aluminum, stator poles 15, stator windings 16, a circuit board 17, which is fastened with stator mounting screws 21 via heat-conducting element 10 to the second pump housing part 24. A suction connector 6 is arranged on the first pump housing part 2 (pump head), which is coaxial to the shaft 3. The shaft 3 is fastened in a mounting 22, which is in one piece via spokes 23 with the suction connector 6. The end of the mounting pin 22 tapers, in order to offer only limited resistance to the inflowing pump medium. The center of the mounting pin 22 forms a passage 25 to a flow channel 26 in the center of the hollow shaft 3. The heat-conducting element consists of a disk 40, in whose central area a tube 39 and on whose periphery three spacer sleeves 38 protrude. The connection area of the heat-conducting element 10 with the split plate 18 is sealed via an annular cord seal 19, which is inserted into a peripheral groove 29 in tube 39. Stator mounting screws 21 serve for fastening of a circuit board 17 and for fastening of the heat-conducting element 10 on the second pump housing part 24.

Figure 2:
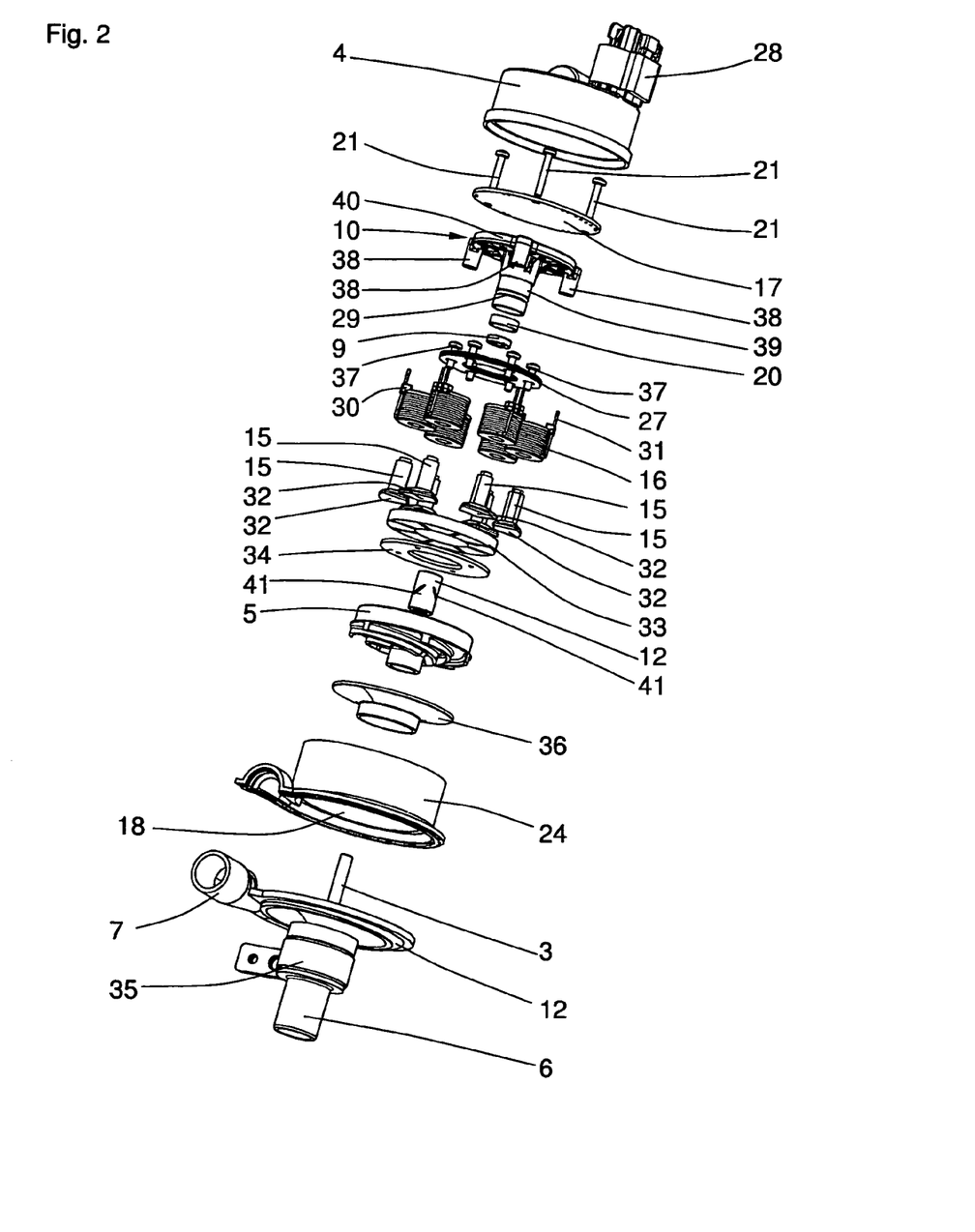
FIG. 2 shows an exploded view of the rotary pump.

From the top down, FIG. 2 shows the motor housing 4 with the molded-on plug housing 28, the stator mounting screws 21, the circuit board 17, the heat conducting element 10, with the disk 40, the spacer sleeves 38, the tube 39 and the groove 29, the bearing support ring 20, the axial bearing ring 9, the stator return ring 27, which are fastened with return mounting screws 37, insulation elements 30 with connection pins 31, the insulation elements 30 being wound with stator winding 16, poles 15, with pole shoes 32 greater in cross-section, a rotor magnet 33, a rotor return ring 34, the fixed bearing 12 with notches 41 for more intimate connection to pump impeller 5, a cover disk 36, the second pump housing part 24 with split plate 18, a shaft 3, the first pump housing 2 (pump head), a fastening ring 35, suction connector 6 and a pressure connector 7. In the interest of clarity, the sequence of components is partially transposed in FIG. 2.

The pump motor for FIGS. 1 and 2 is an electronically commutated DC motor with individual poles aligned parallel to the axis of rotation, each with a cylinder coil. The motor has an axial air gap. The return ring 27 of the stator consists of a laminated core. The poles 15 are produced from powder metal. Return ring 27 and poles 15 are screwed to each other and with the stator element. Through another screw connection, the circuit board 17 is screwed to the heat conducting element 10 and the second pump housing part 24. The pump impeller 5 forms the permanent magnetic rotor of the DC motor with the rotor magnet 33, rotor return ring 34 and the hollow cylindrical fixed bearing 12. The rotor magnet 33, as well as the rotor return ring 34 [sic]

Figure 3:
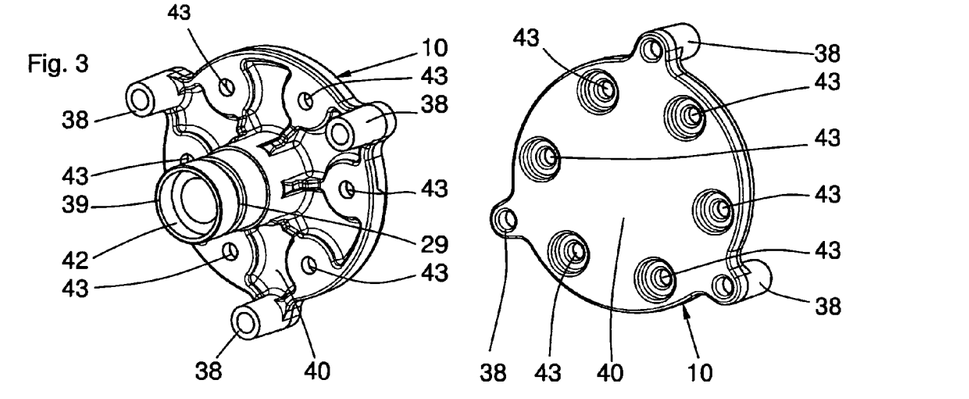
FIG. 3 shows three-dimensional views of a heat conducting element

FIG. 3 shows an exploded three-dimensional views of the heat-conducting element 10, with the disk 40, tube 39, spacer sleeves 38, groove 29, a receiving space 42 for the bearing support ring 20 and pole fastening recesses 43.

Figure 4:
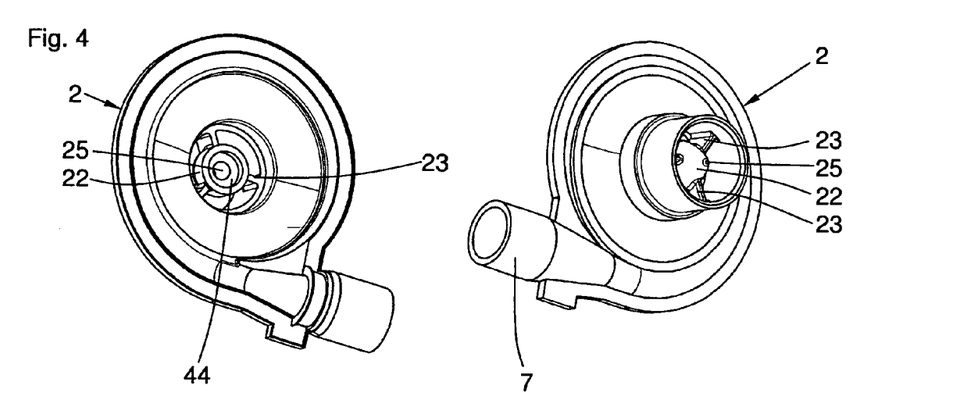
FIG. 4 shows three-dimensional views of a first pump housing part.

FIG. 4 shows an exploded three-dimensional views of the first pump housing part 2 with the mounting pin 22, the spokes 23, passage 25 and a receiving space for the first axial bearing ring 44.

Figure 5:
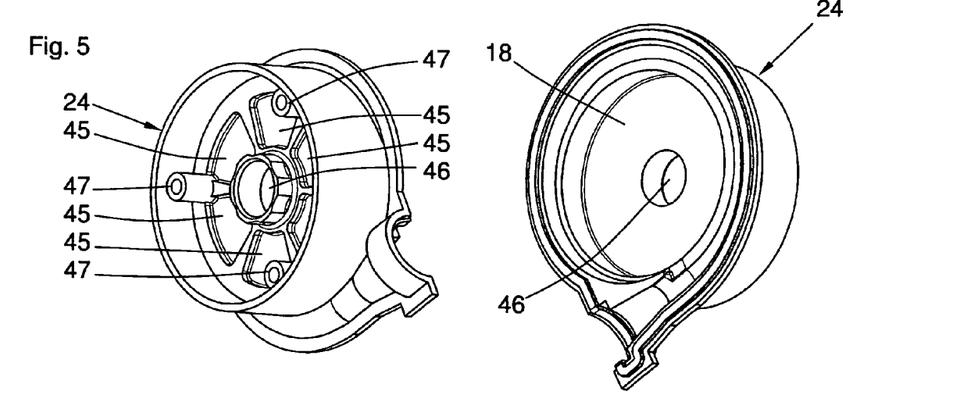
FIG. 5 shows three-dimensional views of a second pump housing part.

FIG. 5 shows an exploded three-dimensional views of the second pump housing part 24 with the split plate 18, which has recesses 45 in the area of the poles being installed, in order to obtain the smallest possible air gap in the magnetic circuit of the motor, a central passage 46 for the shaft 3 and three threaded bushings 47 for fastening of the stator by means of the stator mounting screws.

Figure 6:
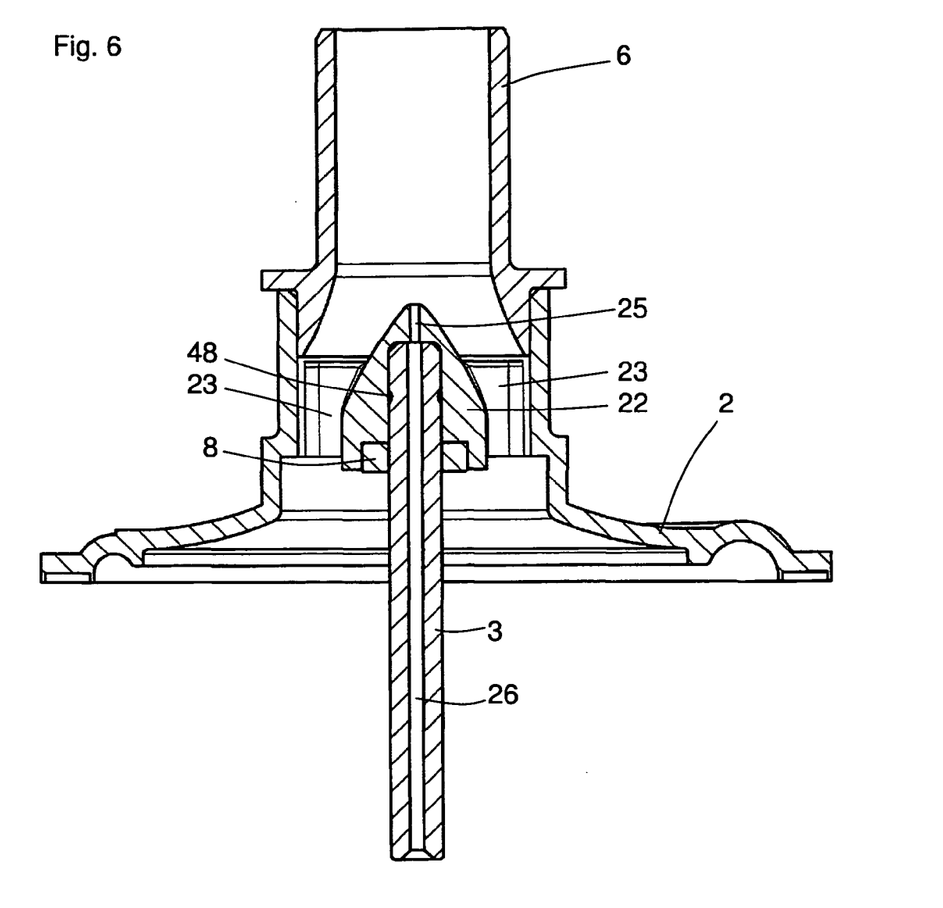
FIG. 6 shows a sectional view through the first pump housing part with an installed fixed shaft.

FIG. 6 shows a sectional view through the first pump housing part 2 with the installed fixed shaft 3, with its flow channel 26, passage 25, the first axial bearing ring 8, the spokes 23 and the suction connector 6. The shaft has a notch 48 that ensures intimate connection with the mounting pin.

Figure 7:
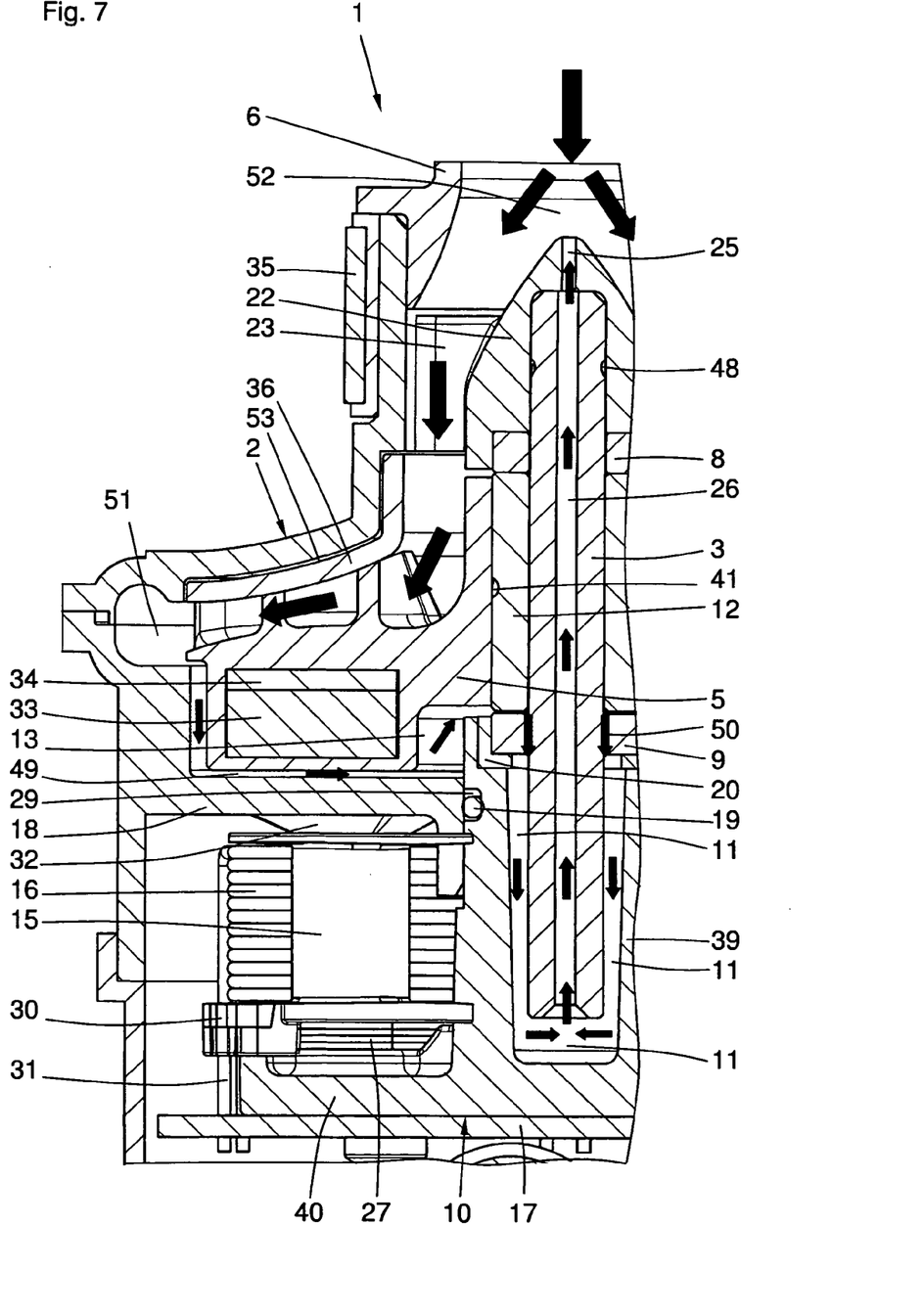
FIG. 7 shows an enlarged partial sectional view of the pump.

FIG. 7 shows an enlarged partial section of the rotary pump 1 according to the invention, configured so that a continuous cooling and degassing stream runs from a pressure area 51 via the "air gap" 49 and an annular gap 50 between the second axial bearing ring 9 and the shaft 3 into the cavity 11 and from there, via the flow channel 26 of hollow shaft 3 and passage 25 of the mounting pin 22, back into the suction area 52. The special feature here is the large surface, via which the heat-conducting element 10, which consists of good heat conducting aluminum, is in contact with the feed medium. The size of this surface is determined by the length of the cavity 11, its diameter, the length of tube 39, which extends into pump space 13, and its diameter.

Through the described configuration, the feed medium is forced into a type of meandering trend and can absorb heat from the heat-conducting element 10 longer than in the previously known solutions and transport it away. Despite this large heat transfer surface, the size relative to comparable pumps is not increased and only a small annular sealing area is present, which can be sealed by simple means, as here with the annular cord seal 19 inserted into groove 29. A gap 53 between cover disk 36 of the pump impeller 5 and the first pump housing part 2 is more readily apparent in FIG. 7 than in FIG. 1. This gap 53 must be as small as possible, in order to achieve a high efficiency. Maximum accuracy is achieved through the precisely aligned shaft 3 during the deformation process of the first pump housing part 2.

Figure 8A:
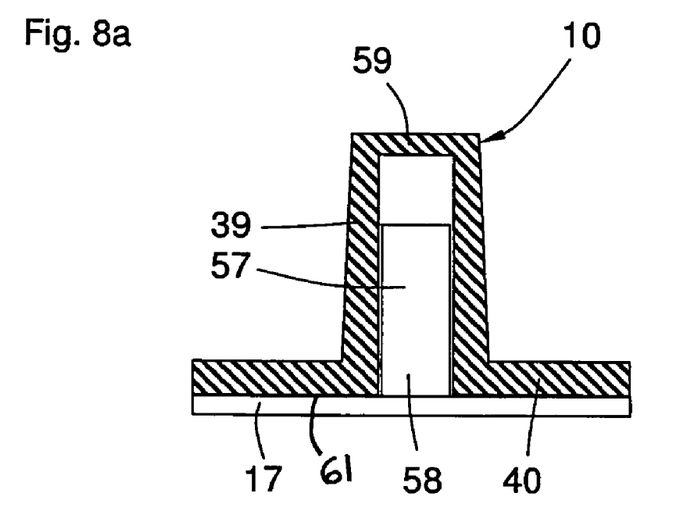
FIG. 8a shows a second variant of the heat conducting element and FIG. 8b shows the third variant of the heat-conducting element.

FIG. 8a shows a second variant of the heat-conducting element 10, in which the disk 40 is provided in the center with an opening and the tube 39 is closed by a bottom 59 on its side facing the pump impeller. Through this embodiment, the possibility is obtained for accommodating a capacitor 57, which is arranged in circuit board 17 in space-saving fashion.

Figure 8B:
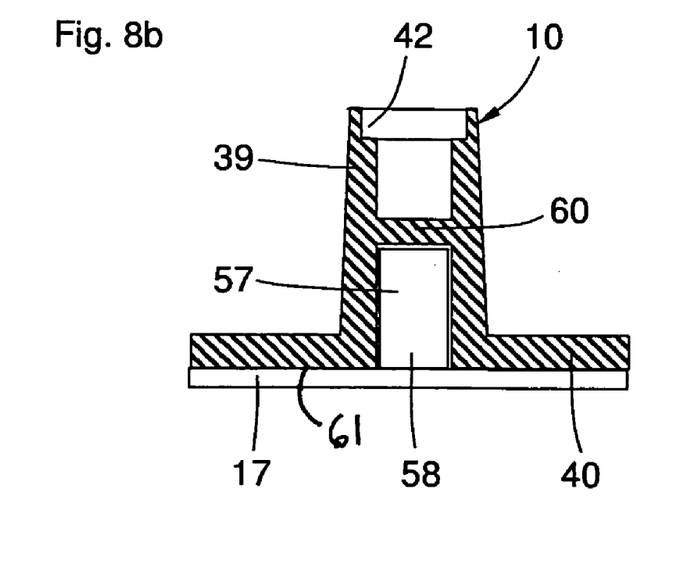

FIG. 8b shows a third variant of the heat-conducting element 10, in which the tube 39 is open on both sides, but in its middle area a partition 60 is provided, which separates the dry space from the wet space. The third variant combines the two first variants with each other. In the first place, a space for the capacitor 57 is present and, in the second place, part of the rotor 39 can also be used as a cooling channel according to the first variant. A receiving space 42 for a bearing is situated on the tube end 39.

It is proposed that the circuit board 17 is in heat conducting contact over a large surface with the heat-conducting element 10 and is connected via stator mounting screws 21 to the heat conducting element and a pump housing part 24. Better thermal contact of the circuit board with the heat-conducting element 10 is achieved through the mounting screws.

Individual conductor tracks 61, especially ground conductor tracks, can also conceivably be brought in contact with the heat-conducting element 10, in which case heat removal occurs particularly effectively. To avoid short-circuits, recesses can be provided in the heat-conducting element 10 in conductor areas that carry voltage.

In order to achieve particularly simple assembly and reliable installation of a sealant and reliable sealing effect, it is proposed that a single annular cord seal 19 be provided for sealing between the dry space 54 and the pump space 13. The annular cord seal 19 should be arranged here between the heat-conducting element 10 and the split plate 18.

The return ring 27 can also consist of a stack of sheet rings and be screwed to the heat-conducting element 10. The heat transfer resistance is reduced by screw connection. The poles 15 are preferably pressed from powder metal and screwed to the heat-conducting element 10. By using powder metal, greater design freedom exists and, in particular, pole shoes 32 with increased cross-section can be molded onto poles 15.

In order to keep the air gap between the pole surfaces and the pump impeller as limited as possible, it is expedient that the pole shoes 32 are accommodated in recesses 45 of the split plate 18.

The heat-conducting element is shaped so that it includes a disk 40, from which a central tube 39 protrudes in the direction of the pump space. In addition, the tube 39 has a groove 29 on its periphery, in which the annular cord seal 19 is inserted. The tube 39 is arranged within the poles 15 and the stator winding 16, for which reason the diameter of the tube 39 and therefore the annular cord seal is relatively limited. This facilitates assembly and installation of the seal and reduces the length of the sealing area.

According to a modification of the invention the heat-conducting element 10 is in one-piece with spacer sleeves 38, which coincide with threaded bushings 47 of a pump housing part 24, the spacer sleeves 38 being arranged on the outer edge of disk 40. The spacer sleeves serve as supports for the heat-conducting element when screwed to the pump housing. The circuit board 17 is screwed to each threaded bushing 47 with several stator-mounting screws 21, each of which passes through a spacer sleeve 38.

The heat conducting element 10, the return ring 27 and the poles 15 are connected to each other by return mounting screws 37, the poles 15 having threaded blind holes that are open to the side of the poles 15 facing away from the pump space 13. Each pole 15 carries an insulation element 30 wound with a stator winding 16, which is arranged between the pole shoe 32 and the return ring 27.

Particularly good heat removal is achieved when the tube 39 accommodates the end of a hollow shaft 3 free of contact and leaving a partially annular gap-like cavity 11, the annular gap being filled with the feed medium. A large heat transfer surface that occurs between the heat-conducting element 10 and the feed medium and therefore the section of the shaft 3 extending freely into cavity 11 preferably occupies 20-60% of the total length of the shaft 3.

In order for the pump impeller to be optimally guided, the tube 39 carries an axial bearing ring 9 on its end facing the pump space 13. Through this axial bearing ring, the shaft 3 extends without touching the axial bearing ring. An annular gap is thus formed, which is part of a coolant path. If necessary, a bearing support ring 20 can be arranged between the axial bearing ring 9 and the heat-conducting element 10.

In a particularly advantageous modification of the rotary pump, the heat-conducting element 10 protrudes into the pump space. The surface flowed around by the feed medium is further increased on this account, part of the feed medium being guidable via a closed path from the pressure area of the pump via the annular gap between the pump impeller 5 and a split plate 18 of the second pump housing part 24, an intermediate space between the axial bearing ring 9 and the shaft 3, cavity 11, flow channel 26 of shaft 3 and a passage 25 of a mounting pin 22 of the pump head back to the main hydraulic circuit.

A second variant of the invention is characterized by the fact that the disk 40 in the area within the connecting tube 39 has a recess, through which a capacitor 57, which is arranged on the circuit board 17 and can be electrically and mechanically connected to it, extends into the tube 39. Significant space can be saved on this account, especially during use of large capacitors 57.

In this variant of the invention, it can be useful for the end of the tube 39 facing the pump impeller 5 to be closed and hermetically sealed.

A combination of the two variants is also possible, in which a section of tube 39 serves as receiving space for a capacitor 57, and a second section, separated by a partition from the first section, serves as a fluid-traversed cooling channel.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMBERS

1 Rotary pump
2 Pump housing part (pump head)
3 Shaft
4 Pump housing
5 Pump impeller
6 Suction connector
7 Pressure connector
8 First axial bearing ring
9 Second axial bearing ring
10 Heat-conducting element
11 Cavity
12 Hollow cylindrical fixed bearing
13 Pump space
14 Motor housing
15 Pole
16 Stator winding
17 Circuit board
18 Split plate
19 Annular cord seal
20 Bearing mounting ring
21 Stator mounting screws
22 Mounting pin
23 Spokes
24 Second pump housing part
25 Passage in mounting pin
26 Flow channel
27 Stator return ring
28 Plug housing
29 Groove
30 Insulation element
31 Connection pin
32 Pole shoe
33 Rotor magnet
34 Rotor return ring
35 Fastening ring
36 Cover disk (to pump impeller 5)
37 Return mounting screws
38 Spacer sleeves
39 Tube
40 Disk
41 Notch
42 Receiving space
43 Pole fastening recesses
44 Mounting space for axial bearing ring
45 Recesses for poles
46 Passage for shaft
47 Threaded bushing
48 Notch in shaft
49 Air gap
50 Annular gap
51 Pressure area
52 Suction area
53 Gap
54 Dry chambers
55 Stator
56 Axial motor
57 Capacitor
58 Opening
59 Bottom
60 Partition
61 Conductive Tracks

What is claimed is:

1. A rotary pump, which can be driven by an electronically commutated DC motor with an axial gap, a wound stator, and a motor shaft, the rotary pump comprising:
    a dry chamber, in which the wound stator is accommodated;
    a permanent magnetic pump impeller;
    a fluid-fillable pump space, in which the pump impeller is accommodated to rotate;
    a split plate for separating the pump impeller from the wound stator;
    a return ring connected to and in heat conducting contact with the split plate, the return ring being made up of a stack of sheet rings;
    a plurality of poles connected to the split plate;
    a heat-conducting element made from a heat conducting metal, wherein the heat-conducting element includes a disk aligned at right angles to the motor shaft or an annular disk with a tube connected to it in one piece open or closed to the motor shaft and extending coaxially in the direction toward the pump impeller;
    means for securing the return ring to the heat-conducting element; and
    a circuit board connected to the heat-conducting element on the side facing away from pump impeller.

2. The rotary pump according to claim 1, wherein the heat conducting element is in direct contact with a stream of a feed medium that can be produced by the pump impeller and separates the dry chamber from the pump space.

3. The rotary pump according to claim 1, further comprising: a pump housing and a plurality of stator-mounting screws, wherein the circuit board is in heat conducting contact over a large area with the heat-conducting element and is connected to the heat-conducting element and the pump housing via the stator-mounting screws.

4. The rotary pump according to claim 1, further comprising electrically conductive tracks on the circuit board and in heat conducting contact with the heat-conducting element.

5. The rotary pump according to claim 2, further comprising a single annular cord seal for sealing between the dry chamber and the pump space.

6. The rotary pump according to claim 5, wherein the annular cord seal is arranged between the heat-conducting element and the split plate.

7. The rotary pump according to claim 5, wherein the tube has a groove on its periphery, in which the annular cord seal is inserted.

8. The rotary pump according to claim 1, further comprising a pump housing part having threaded bushings, wherein the heat-conducting element is in one piece with spacer sleeves, which coincide with the threaded bushings of the pump housing part, the spacer sleeves being arranged on the outer edge of the disk.

9. The rotary pump according to claim 8, wherein the circuit board is screwed to the threaded bushing with several stator-mounting screws, each of which passes through one of the spacer sleeves.

10. The rotary pump according to claim 1, wherein the heat-conducting element, the return ring and the poles are connected to each other by return mounting screws, the poles having threaded blind holes that are open to the side of the poles facing away from the pump space.

11. The rotary pump according to claim 1, further comprises a pump housing, wherein the heat-conducting element, the return ring and the pump housing are fastened to each other.

12. The rotary pump according to claim 10, wherein each pole terminates in a pole shoe and each pole carries an insulation element wound with a plurality of stator windings constituting the wound stator, which is arranged between a pole shoe and the return ring.

13. The rotary pump according to claim 1, wherein the tube accommodates the end of the motor shaft free of contact and leaving a partially annular gap-like cavity, the annular gap being filled with feed medium.

14. The rotary pump according to claim 13, wherein the section of the motor shaft extending freely into the cavity occupies 20-60% of the total length of the motor shaft.

15. The rotary pump according to claim 13, wherein the tube carries a second axial bearing ring on its end facing pump space, through which the motor shaft extends free of contact.

16. The rotary pump according to claim 1, further comprising a second axial bearing ring on the heat-conducting element and a bearing support ring is arranged next to the axial support ring.

17. The rotary pump according to claim 1, wherein the heat-conducting element protrudes into the pump space.

18. The rotary pump according to claim 1, wherein part of a feed medium can be guided via a closed path from a pressure area via an air gap between the pump impeller and the split plate of a second pump housing part, an intermediate space between a second axial bearing ring and the motor shaft, a cavity, a flow channel of the motor shaft and a passage of a mounting pin of a pump head back into a main hydraulic circuit.

19. The rotary pump according to claim 1, wherein the disk in the area within the tube has a recess, through which a capacitor, which is arranged on the circuit board and is electrically and mechanically connected to it, extends into the tube.

20. The rotary pump according to claim 1, wherein the end of the tube facing the pump impeller is closed and hermetically sealed.

21. The rotary pump according to claim 1, wherein a first section of the tube serves as a receiving space for a capacitor and a second section separated by a partition from the first section serves as a cooling channel that can be traversed by fluid.

* * * * *

UNITED STATES PATENT AND TRADEMARK OFFICE
CERTIFICATE OF CORRECTION

PATENT NO. : 8,353,687 B2
APPLICATION NO. : 12/654237
DATED : January 15, 2013
INVENTOR(S) : Michael John Werson et al.

Page 1 of 1

It is certified that error appears in the above-identified patent and that said Letters Patent is hereby corrected as shown below:

Title Page, item (73), Assignee name, change "Dohler Motor GmbH"

to -- Bühler Motor GmbH --

Signed and Sealed this
Fourth Day of June, 2013

Teresa Stanek Rea
*Acting Director of the United States Patent and Trademark Office*